United States Patent [19]

Szenger

[11] Patent Number: 4,497,522
[45] Date of Patent: Feb. 5, 1985

[54] GUIDE MEANS FOR ROLLING ELEMENTS OF A BALL-RACE DEVICE

[75] Inventor: Franz Szenger, Königsbronn, Fed. Rep. of Germany

[73] Assignee: Carl-Zeiss-Stiftung, Oberkochen, Fed. Rep. of Germany

[21] Appl. No.: 492,125

[22] Filed: May 6, 1983

[30] Foreign Application Priority Data

May 19, 1982 [DE] Fed. Rep. of Germany ....... 3218845

[51] Int. Cl.³ ............................................. F16C 29/06
[52] U.S. Cl. .................................................. 308/6 C
[58] Field of Search .............. 308/3 R, 6 C, 6 R, 3 A; 464/168

[56] References Cited

U.S. PATENT DOCUMENTS 3,467,447  9/1969  Newman .............................. 308/6 C
4,405,185  9/1983  Oetjen ................................. 308/6 C

FOREIGN PATENT DOCUMENTS 2264100  7/1973  Fed. Rep. of Germany ...... 308/6 C
2247456  4/1974  Fed. Rep. of Germany ...... 308/6 C
2306364  10/1976  France ................................ 308/6 C Primary Examiner—Lenard A. Footland
Assistant Examiner—Thomas R. Hannon
Attorney, Agent, or Firm—Hopgood, Calimafde, Kalil, Blaustein & Judlowe

[57] ABSTRACT

A ball-race shoe contains plural adjacent endless rows of rotating balls. Balls of adjacent rows are in mutual contact and are staggered with respect to each other to a longitudinal extent equal to the radius of a ball. The arrangement packs the balls as densely as possible so that, with dimensions comparable to those of known devices, both load-carrying capacity and useful life are optimized.

A flat bevel or ramp in the inlet and outlet regions of the otherwise flat load-bearing support plate prevents short-period synchronization errors in the rolling action of individual balls of the ball-race shoe.

13 Claims, 6 Drawing Figures

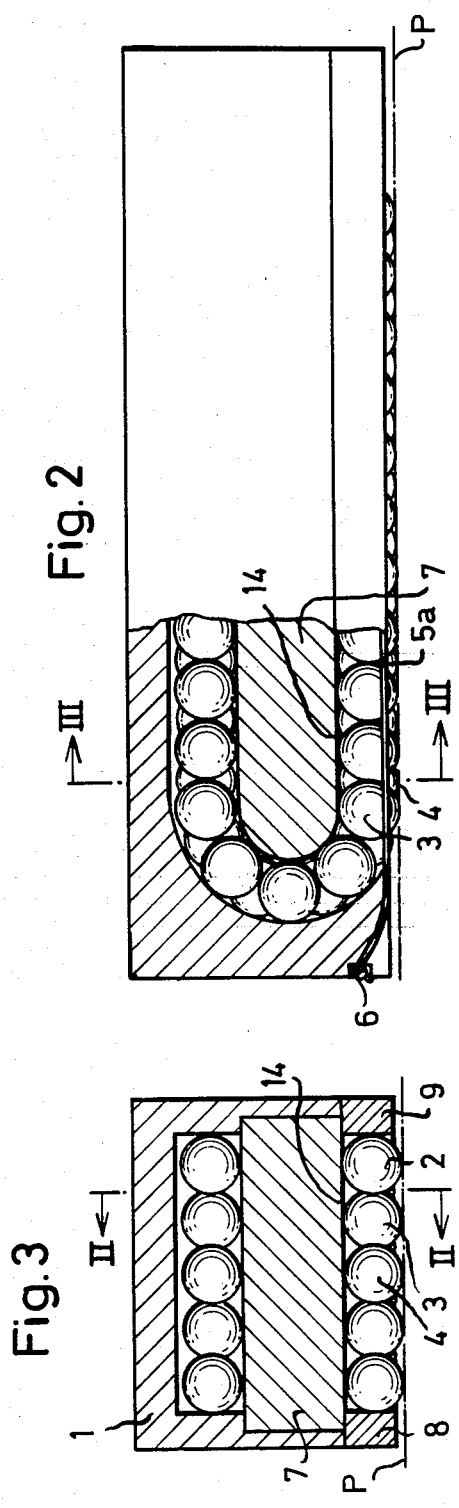

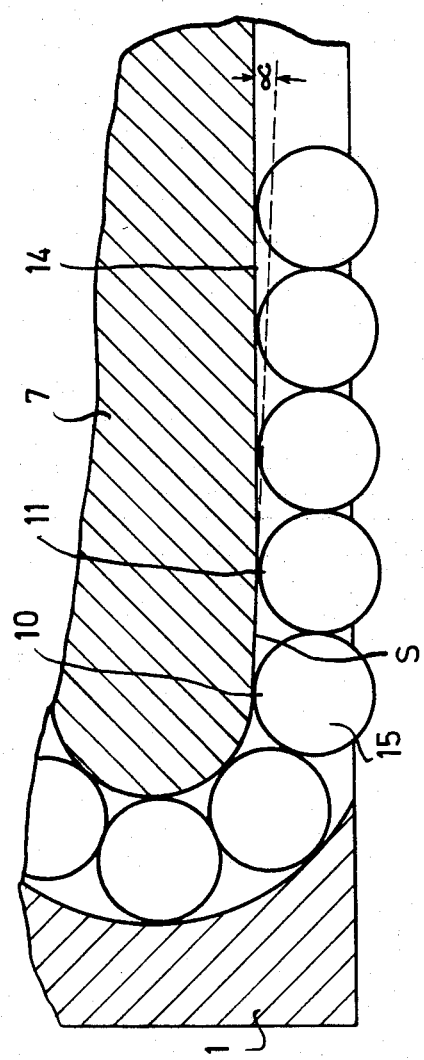
Fig. 4
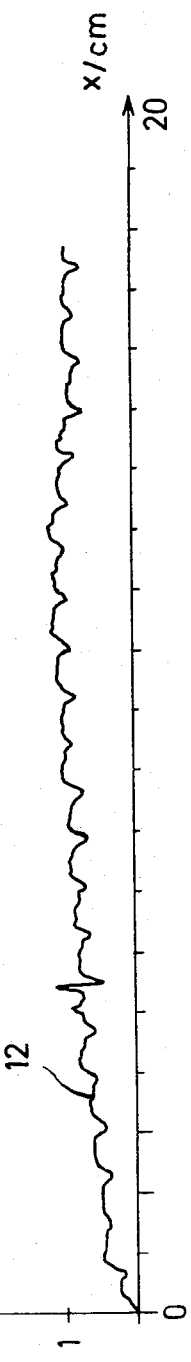
Fig. 5a
Fig. 5b

GUIDE MEANS FOR ROLLING ELEMENTS OF A BALL-RACE DEVICE

BACKGROUND OF THE INVENTION

The present invention relates to guide means for rolling elements, as in the ball race of a travel shoe containing plural rows of balls which travel under load within a partial section thereof.

Such devices are known as "ball-race shoes" or "ball-race guides" and are used for linear bearings under high load, among other things in machine construction. They are similar to the roller-race shoe described in West German Pat. Nos. 2,121,847 and 2,264,100, with the difference that, instead of rollers, a plurality of separately guided rows of balls is employed.

Ball-race shoes have the advantage over roller-race guides, that they avoid the so-called "grinding" action of rollers, due to a sliding axial displacement of rollers with respect to their travel paths, since as a rule, rollers do not travel exactly parallel to their guided direction.

Ball-race guides cannot be subjected to as high a load as roller-race guides, in view of smaller load-bearing surfaces of balls, for the same shoe dimensions.

Both roller-race shoes and ball-race shoes present a problem which limits their use for highly precise tasks, as for example for the guidance of displaceable parts in measurement machines. This problem is manifested in a periodic run-out error (in the order of magnitude of up to several $\mu$m) which is caused by the entrance of a ball or roller from the deflection region into the load region and by the associated change in loadbearing surface. This run-out error is further increased by the tendency of balls within separately guided rows to "synchronize" themselves in the course of shoe operation, i.e., for the balls of all rows to travel simultaneously in and out of the load region.

From West German Pat. No. 2,121,847 it is known, in the case of a roller-race shoe, to accommodate the transition into the load region via a resilient lug which is elastically and upwardly deflected by the incoming rollers, thus providing an entrance ramp. However, this measure only improves run-in behavior of a roller-race shoe under greater-load conditions, when substantial deflection of the lug occurs.

From West German Pat. No. 2,264,100 and West German published patent application (Offenlegungsschrift) OS 2,620,864, it is known to provide a shallow bevel at the run-in region for rollers in roller-race shoes. This bevel has the purpose of delaying the flow of rollers within the run-in region; its angle is selected correspondingly large. Therefore, the aforementioned run-out error also occurs in these known roller-race shoes.

BRIEF STATEMENT OF THE INVENTION

The object of the present invention is to develop a rolling element guide of the aforementioned type, specifically a ball-race shoe, in such manner that it has the highest possible load-bearing capacity in terms of its dimensions.

The object is achieved by providing a multiple-row ball-race shoe wherein the balls in adjacent rows are in staggered relation to each other, to an extent equal to the radius of a ball, and are also in mutually contacting relation.

With ball-race shoes of the invention, there is no need for separate guidance of individual rows of balls. Rather, the balls of individual rows are guided directly by the balls of adjacent rows, since dense packing prevents their loss of guidance. Even though adjacent balls contact each other, there is nevertheless no friction of sufficient magnitude to detrimentally affect use of the guide.

The densest possible packing of bearing balls enables a shoe of given dimensions to have the highest possible load-bearing capacity and stiffness. And if one compares such a bearing with traditional ball-race shoes under the same load, a far longer life is obtained, due to lower pressure per loadbearing ball. Further, the larger number of bearing balls results in better integration of the microgeometry of the travel surface, which has a positive effect on quiet operation of the shoe. The aforementioned "synchronization effect" acts only on half of the rows of balls.

To prevent the balls dropping out on the support side of the ball-race shoe, it is advisable to provide tensioned wires or threads, as of nylon, between the rows of balls. These wires serve to facilitate handling of the bearing in the course of transportation and assembly. In installed condition, on the other hand, they have no function. Instead of the threads, one may also use a thin covering cap of sheet metal, which is removed after the installation of the bearing.

It is further advantageous for the support body of the travel shoe to consist of a flat plate which is rounded at both ends of the travel region and has a flat bevel in the inlet region and the outlet region approximately over a length equal to the diameter of a ball. The angle at which this bevel is inclined to the travel surface of the rotation shoe should correspond approximately to the ratio between the flattening of the balls of the guide which takes place under rated load and the diameter of the balls. In this way, assurance is had that pressure on incoming balls increases gradually (not abruptly) and decreases slowly upon running out. The short-period synchronization error inherent in known ball-race shoes, which error is caused by the sudden entrance and emergence of the balls from the travel region, is thus avoided.

DETAILED DESCRIPTION

The invention will be illustratively described in detail, in conjunction with the accompanying drawings in which:

FIG. 1 is a view looking up at the support side or bottom of a ball-race shoe according to the invention;

FIG. 2 is a side view in elevation, partly broken away and in section along the line II—II of FIG. 1;

FIG. 3 is a sectional view through the shoe of FIG. 1, taken along the line III—III of FIG. 1 or FIG. 2;

FIG. 4 is an enlarged fragmentary view to show detail of the entrance region of the shoe of FIG. 2; and FIGS. 5a and 5b graphically depict vertical synchronization error of known ball-race shoes (FIG. 5b) in comparison with that of a ball-race shoe of the invention (FIG. 5a), as a function of longitudinal position in the ball-guidance direction.

The ball-race shoe of FIGS. 1 to 3 comprises a parallelepiped housing 1 which is open toward the bottom and within which the narrow side of a flat support plate 7 is fastened to the two side walls of housing 1. Between convexly rounded ends of the support plate 7 and concavely rounded inner sides of the opposite wall of housing 1, a race passage is defined for endless successions of rotating balls which are not under load within housing 1 but which are under load between the bottom of the support plate 7 and the support plane (phantom line P, in FIGS. 2 and 3) on which the shoe rides or is to ride.

These balls are arranged in five travel or race rows, densely packed in such manner that individual balls, for example, the balls 2, 3 and 4 of adjacent rows are staggered with respect to each other in the direction of travel, by an amount equal to the diameter of a ball. The travel region is limited laterally by two ledges 8 and 9. Within this travel region, the balls of each row are guided by the balls of adjacent rows against which they rest.

Four nylon bands 5a, 5b, 5c, 5d are tensed in the travel direction and are positioned between balls of adjacent rows to prevent balls from dropping out of the ball-race shoe. Thickened ends of these bands 5a...5d locate in two transverse grooves 6, at the respective ends of housing 1; the ends of the bands are held in grooves 6 by reason of inherent tension in the bands.

As shown in FIG. 4, the respective longitudinal ends of the bottom surface 14 of support plate 7 are beveled (with respect to the travel surface) within a region S which directly adjoins the rounded end of the support plate 7; region S is shown extending between points marked 10 and 11, over a length equal to about the diameter of a ball. The inclination angle α of this bevel is selected such that an entering ball 15 present at point 10 still just does not experience any Hertzian pressure at the rated load of the shoe; using characteristic data for currently available materials, this angle α is less than 1°. It will be understood that plate 7 also has a similar but oppositely sloping bevel S at the outlet region of the bearing at the opposite end, not shown.

In FIG. 5a, the curve 13 shows the vertical synchronization error ΔZ of a ball-race shoe as described and provided with bevels S at its opposite longitudinal ends. This run-out error is seen to give the loaded shoe purely long-period behavior.

On the other hand, the curve 12 shown for a traditional ball-race shoe in FIG. 5b, wherein plural rows of balls are separate and are not in the staggered array of the invention, has a course which is characterized by short-period "jags". These "jags" are caused in each case by the abrupt entrance or emergence of a ball into or out of the load-sustaining travel region.

What is claimed is:

1. Guide means for rolling elements of a travel shoe having plural rows of balls rotating under load in a partial section thereof, characterized by the fact that the travel path of each row of balls is in a ball-travel plane, that the ball-travel planes of the respective rows are in spaced parallel relation, the spacing between ball-travel planes of adjacent rows being less than ball diameter with the balls (2, 3, 4) of adjacent rows in nested contact and staggered in their direction of travel with respect to each other by a length equal to the radius of a ball.

2. A travel shoe comprising a housing having a downwardly open internal ball-race cavity defined by spaced elongate parallel vertical sidewalls and by an upper wall and by concavely rounded end walls tangent to the upper wall, said sidewalls having a bottom edge establishing a bottom plane of said sidewalls; a horizontal plate mounted to and extending between said sidewalls, said plate having an upper surface at vertical offset beneath said upper wall and having convexly rounded ends spaced from and substantially coaxial with respect to the respective concavely rounded end walls of said housing, and said plate having a bottom surface at vertical offset above the bottom plane of said sidewalls; plural adjacent endless rows of balls retained by and between said side walls and extending continuously around the upper and and lower surfaces and ends of said plate with balls of each row in longitudinally staggered and nested contact with balls of the next adjacent row, the offset of the bottom of said plate above the bottom plane established by said side walls being greater than ball radius and less than ball diameter.

3. The travel shoe of claim 2, in which the vertical offset between said plate and said upper wall slightly exceeds ball diameter.

4. A travel shoe according to claim 2, in which for each pair of adjacent rows of balls a retaining wire or thread is tensed between said end walls at substantially the bottom plane of said sidewalls and on an alignment between the adjacent rows of the involved pair.

5. A travel shoe according to claim 4, in which said retaining wire or thread is a nylon filament.

6. A travel shoe according to claim 2, in which the bottom surface of said plate is characterized by a flat bevel at each of the respective ends of the bottom surface, and said bottom surface is flat, thereby defining a ball-travel surface between said bevels, the length of each bevel in the direction of ball travel being approximately equal to ball diameter, whereby in the context of a given rated vertically downward load applied to said shoe and with balls beneath said plate in contact with a flat supporting surface over which the shoe is movable in the direction of ball travel, the balls contacting said ball-travel surface will each elastically deform to an incremental extent reflecting the magnitude of the rated load.

7. A travel shoe according to claim 6, in which each bevel is inclined to the ball-travel surface at a slope which corresponds approximately to the said incremental extent divided by ball diameter.

8. A travel shoe according to claim 7, in which said slope is less than 1 degree.

9. A travel shoe according to claim 2, in which the plurality of rows of balls in longitudinally staggered and nested contact is greater than two.

10. A travel shoe according to claim 2, in which the plurality of rows of balls in longitudinally staggered and nested contact is five.

11. A travel shoe according to claim 2, in which the offset of the upper surface of said plate beneath said upper wall exceeds ball diameter whereby balls between said plate and said upper wall are not under load.

12. A travel shoe comprising a housing having a downwardly open ball-race cavity defined by spaced parallel sidewalls, concavely formed end walls and an upper wall, a plate mounted to and extending between said sidewalls, said plate being parallel to and at vertical offset beneath the surface of said upper walls, plural adjacent endless rows of balls retained by and between said sidewalls and end walls and extending continuously around said plate with balls of each row in longitudinally staggered and nested contact with balls of the next adjacent row.

13. A travel shoe comprising a housing having a first pair of parallel walls, a second pair of concavely formed walls and a flat wall, said walls defining a substantially rectangular, one side open cavity, a plate mounted to and extending between said first pair of walls, said plate being parallel to and spaced from said flat wall, plural adjacent endless rows of balls retained by and extending continuously around said plate with balls of each row in longitudinally staggered and nested contact with balls of the next adjacent row.

* * * * *